United States Patent
Chen et al.

(10) Patent No.: US 11,898,306 B2
(45) Date of Patent: Feb. 13, 2024

(54) SIZING AGENT COMPOSITION, CARBON FIBER MATERIAL AND COMPOSITE MATERIAL

(71) Applicant: FORMOSA PLASTICS CORPORATION, Kaohsiung (TW)

(72) Inventors: Hsuan-Yin Chen, Kaohsiung (TW); Long-Tyan Hwang, Kaohsiung (TW)

(73) Assignee: FORMOSA PLASTICS CORPORATION, Kaohsiung (TW)

( * ) Notice: Subject to any disclaimer, the term of this patent is extended or adjusted under 35 U.S.C. 154(b) by 0 days.

(21) Appl. No.: 17/851,681

(22) Filed: Jun. 28, 2022

(65) Prior Publication Data

US 2022/0411995 A1    Dec. 29, 2022

(30) Foreign Application Priority Data

Jun. 28, 2021   (TW) ................. 110123653

(51) Int. Cl.
| | | |
|---|---|---|
| *C08K 9/04* | (2006.01) | |
| *D06M 15/55* | (2006.01) | |
| *D01F 9/12* | (2006.01) | |
| *D01F 11/14* | (2006.01) | |
| *D06M 13/07* | (2006.01) | |

(52) U.S. Cl.
CPC ............. *D06M 15/55* (2013.01); *C08K 9/04* (2013.01); *D01F 9/12* (2013.01); *D01F 11/14* (2013.01); *D06M 13/07* (2013.01); *D06M 2200/40* (2013.01)

(58) Field of Classification Search
CPC .. D06M 15/55; D06M 13/07; D06M 2200/40; D06M 13/152; D06M 13/345; D06M 13/11; D06M 2101/40; D06M 15/37; D06M 15/54; D06M 13/02; D06M 15/53; C08K 9/04; D01F 9/12; D01F 11/14
USPC ........................................ 523/206
See application file for complete search history.

(56) References Cited

U.S. PATENT DOCUMENTS

| | | | | |
|---|---|---|---|---|
| 2015/0018451 | A1* | 1/2015 | Kikuta | D06M 13/2246 |
| | | | | 428/394 |
| 2017/0284015 | A1* | 10/2017 | Sakaguchi | D06M 13/395 |
| 2017/0349720 | A1* | 12/2017 | Hiasa | B05D 3/007 |
| 2021/0108363 | A1 | 4/2021 | Kaneta et al. | |
| 2022/0396914 | A1* | 12/2022 | Lin | C08J 5/042 |

FOREIGN PATENT DOCUMENTS

| | | |
|---|---|---|
| CN | 1527895 A | 9/2004 |
| CN | 1701148 A | 11/2005 |
| CN | 102899901 A | 1/2013 |
| CN | 105378176 A | 3/2016 |
| CN | 112292488 A | 1/2021 |
| JP | 2004-224979 A | 8/2004 |
| JP | 2006-336150 A | 12/2006 |
| JP | 2008-280624 A | 11/2008 |
| JP | 2021-063307 A | 4/2021 |
| TW | 201333296 A | 8/2013 |
| TW | 201437447 A | 10/2014 |
| TW | 201816006 A | 5/2018 |
| TW | 202014576 A | 4/2020 |
| WO | WO2013/099707 A1 | 7/2013 |
| WO | WO2013/146024 A1 | 10/2013 |
| WO | WO2015045618 A1 | 4/2015 |
| WO | WO2020/004523 A1 | 1/2020 |

\* cited by examiner

*Primary Examiner* — Hannah J Pak

(74) *Attorney, Agent, or Firm* — MUNCY GEISSLER OLDS & LOWE P.C.

(57) ABSTRACT

The present application relates to a sizing agent composition, a carbon fiber material and a composite material. The sizing agent composition comprises specific compositions, thereby producing a sizing agent having emulsion droplets with specific diameter. The sizing agent has excellent emulsion stability, and it can efficiently improve hygroscopicity and dimensional stability of the carbon fiber material. Besides, the sizing agent can improve bonding properties between the carbon fiber material and resin matrix, therefore enhancing properties of the composite material.

14 Claims, No Drawings

SIZING AGENT COMPOSITION, CARBON FIBER MATERIAL AND COMPOSITE MATERIAL

RELATED APPLICATIONS

This application claims priority to Taiwan Application Serial Number 110123653, filed Jun. 28, 2021, which is herein incorporated by reference.

BACKGROUND

Field of Invention

This application relates to a sizing agent composition. More particularly, a sizing composition which can efficiently lower hygroscopicity and dimensional change ratio of a carbon fiber material and have excellent bonding properties with a carbon fiber substrate, a carbon fiber material containing the sizing agent and a composite material are provided.

Description of Related Art

Due to the light weight and good mechanical properties, the carbon fibers are often used as a reinforced material for a resin matrix to form a composite material. However, since carbon fibers are relatively hard and fragile and have smaller shrinkage ratio, hairiness and filament broken are easily presented during processing. Therefore, the mechanical properties and infiltration characteristics of the carbon fibers are reduced, and further the properties of the obtained composite materials are lowered.

A sizing agent is often coated on a surface of the carbon fibers to protect the surface for inhibiting the defects of hairiness of the carbon fibers. Moreover, a strand integrity of the carbon fibers can be improved by sizing the surface, and further a coiling storage stability and an operability of the carbon fibers can be increased. While the composite materials are prepared, the sizing agent on the surface of the carbon fibers can be used as a coupling agent, thereby enhancing the infiltration property between the carbon fibers and the resin matrix, and further the bonding properties therebetween can be improved. Conventional sizing agents are made of epoxy resin. The conventional sizing agent can form a protective thin film on the surface of the carbon fiber with good film-forming property of the epoxy resin to inhibit the defects of hairiness. The protective thin film of the epoxy resin is made of ethylene oxide segment. Although the carbon fiber material can have good dispersity in the water because of the excellent water solubility of the ethylene oxide segment, moisture in the air is easily absorbed by the ethylene oxide segment, thereby enhancing the adhesiveness between bundles of carbon fibers, further inducing the defects of adhesiveness between carbon fibers, and therefore the operability is lowered.

Furthermore, another conventional sizing agent is used in order to improve the strand integrity of the carbon fibers and inhibit the defects of hairiness, and the sizing agent is formed by mixing aforementioned epoxy resin and a polyurethane resin, thereby enhancing the strand integrity by the film formed from the polyurethane resin and improving the defects of hairiness. However, the film of the polyurethane resin has defects of age hardening. A yet another conventional sizing agent is prepared by mixing the epoxy resin, acrylic compounds, and polyester resin with bisphenol backbone and polyoxyethylene chain. Although this sizing agent can be efficiently used to inhibit the defects of hairiness of the carbon fibers and enhance the bonding properties between the carbon fibers and the resin matrix, moisture in the air is still easily absorbed by ester groups contained in the sizing agent, thereby inducing the defects of adhesiveness of carbon fibers.

In view of this, there is an urgent need to provide a sizing agent composition, a carbon fiber material and a composite material to prevent from the defects of poor storage stability and adhesiveness due to moisture absorbing of the conventional sizing agent, and improve the bonding properties between the carbon fiber material and the resin matrix.

SUMMARY

Therefore, an aspect of the present application is to provide a sizing agent composition. The sizing agent composition comprises specific compositions, and can efficiently improve hygroscopicity and dimensional change ratio of a carbon fiber material.

Another aspect of the application is to provided a carbon fiber material. The carbon fiber material includes a sizing agent formed from the aforementioned sizing agent composition, and therefore the carbon fiber material has lower hygroscopicity and dimensional change ratio.

Yet another aspect of the present application is to provide a composite material. The composite material includes the aforementioned carbon fiber material, and the carbon fiber material has excellent bonding properties with a resin matrix.

According to an aspect of the present application, a sizing agent composition is provided. The sizing agent composition comprises an epoxy compound, a dicyclopentadiene compound, a surfactant and water. Based on an amount of sizing agent composition as 100 parts by weight, an amount of the epoxy compound is 2 parts by weight to 30 parts by weight, an amount of the dicyclopentadiene compound is 2 parts by weight to 30 parts by weight, an amount of the surfactant is 0.5 parts by weight to 15 parts by weight, and an amount of water is 25 parts by weight to 95.5 parts by weight.

According to some embodiments of the present application, an epoxy equivalent of the aforementioned epoxy compound is 100 g/eq to 1500 g/eq.

According to some embodiments of the present application, the aforementioned dicyclopentadiene compound has a structure shown as following formula (I).

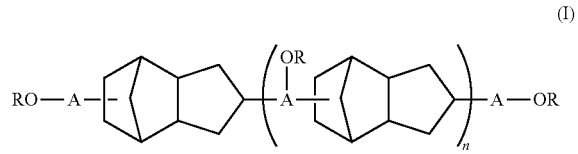

In the formula (I), A independently represents a cyclic group; R independently, represents a hydrogen atom or a functional group shown as following formula (I-1) to formula (I-3); and n represents 0 or 1. In the formula (I-3), m represents 1 to 5.

-continued (I-2)
$$—C≡N$$

(I-3)
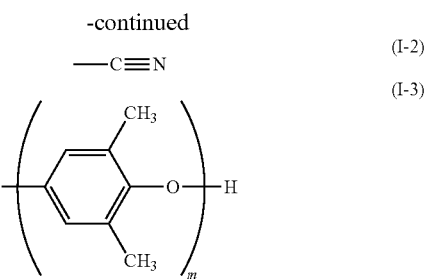

According to some embodiments of the present application, at least one of the aforementioned R represents the structure shown as the formula (I-3).

According to some embodiments of the present application, the aforementioned dicyclopentadiene compound has a structure shown as following formula (III).

(III)
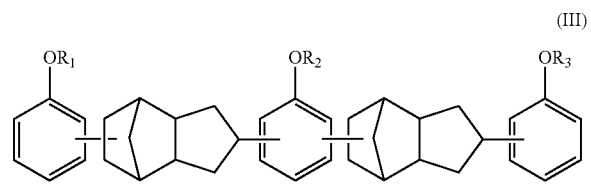

In the formula (III), $R_1$ and $R_2$ represent a hydrogen atom, and $R_3$ represents the structure shown as the formula (I-3).

According to some embodiments of the present application, the aforementioned surfactant at least includes a non-ionic surfactant.

According to some embodiments of the present application, the aforementioned surfactant includes an anionic surfactant or a combination of an anionic surfactant and a nonionic surfactant.

According to some embodiments of the present application, the aforementioned surfactant includes anionic surfactant with ammonium ion.

According to some embodiments of the present application, the aforementioned sizing agent composition excludes organic solvents.

According to some embodiments of the present application, the sizing composition is an emulsion, and a droplet diameter of the emulsified droplets is not larger than 1 μm.

According to another aspect of the present application, a carbon fiber material is provided. The carbon fiber material comprises a carbon fiber substrate and the aforementioned sizing agent, and the sizing agent includes the aforementioned sizing agent composition. The sizing agent is coated on a surface of the carbon fiber substrate, and a droplet diameter of the sizing agent is not larger than 1 μm.

According to some embodiments of the present application, the aforementioned sizing agent is not subjected to a thermal reaction at a temperature less than and equal to 250° C., and the thermal reaction is induced by heat energy.

According to some embodiments of the present application, a sizing ratio of the aforementioned carbon fiber material is 0.1 wt % to 5 wt %.

According to some embodiments of the present application, a hygroscopicity of the aforementioned carbon fiber is lower than 0.05%, and a dimensional change ratio is lower than 0.05%.

According to yet another aspect of the present application, a composite material is provided. The composite material includes a resin matrix and the aforementioned carbon fiber material. The carbon fiber material is dispersed within the resin matrix, and interlaminar shear strength (ILSS) between the resin matrix and the carbon fiber material is not less than 8 kgf/mm².

In the sizing agent composition, the carbon fiber material and the composite material off the present application, the sizing agent is formed from the sizing agent composition with a compound containing non-polar groups of dicyclopentadiene, thereby lowering hygroscopicity and dimensional change ratio of the obtained carbon fiber material, further preventing from adhering defects of the carbon fiber due to moisture absorption, and therefore operability of the carbon fiber material can be enhanced. Furthermore, the sizing agent of the present application can efficiently enhance bonding properties between the carbon fiber material and the resin matrix, and further properties of the composite materials can be improved to meet mechanical requirements of back-end applications and inhibit defects of age hardening.

DETAILED DESCRIPTION

The following describes manufacturing and utilizing embodiments of the present application in detail. However, it can be understood that various applicable inventive concepts are provided in embodiments that can be applied in a variety of specific contents. Specific embodiments described are only for descriptive purposes, and are not intended to be limiting.

The sizing agent of the present application is formed from the sizing agent composition. There are no specific limitations in the method of producing the sizing agent, and one skilled in the art can produce the sizing agent composition with conventional techniques and equipment rather than focusing or mentioning them in details. For example, a uniformly dispersed emulsion type sizing agent is prepared by mechanical shearing force, and the equipment can be, for example, a paddle-type stirring blade (such as: the blade shape can be dissolving type, trilobal type and/or quadrilobal type) and/or an anchor-type stirring blade. Alternatively, the sizing agent composition may be dispersed with an ultrasonic homogenizer, a high-speed homogenizer, and/or a high-speed emulsifier to form the sizing agent of the present application.

The sizing agent composition of the present application comprises an epoxy compound, a dicyclopentadiene compound, a surfactant and water.

The epoxy compound can be a resin compound including at least one epoxy group, and there are no specific limitations to the epoxy compound. For example, the epoxy compound can include but be not limited to bisphenol A type epoxy resin, bisphenol F type epoxy resin, phenolic epoxy resin, naphthalene skeleton type epoxy resin, linear aliphatic skeleton type epoxy resin, other suitable epoxy compounds, or a combination thereof.

For example, the bisphenol A epoxy resin can be commercial products manufactured by Nan Ya Plastics Corporation, and the trade name is NPEL 127, 128, 134, 901, 902, 904 or the like; commercial products manufactured by Hexion Inc., and the trade name is EPON TM 828, 830, 834, 1001F or the like; commercial products manufactured by Chang Chun Plastics Co., Ltd., and the trade name is BE 114, 186, 188 or the like; commercial products manufactured by ADEKA Corporation, and the trade name is EP 4100, 4300, 4700 or the like.

For example, the bisphenol F type epoxy resin can be commercial products manufactured by Nan Ya Plastics Corporation, and the trade name is NPEF 170 or the like; commercial products manufactured by Hexion Inc., and the trade name is EPON TM 869 or the like; commercial products manufactured by Mitsubishi Chemical Corporation, and the trade name is jER 806, 807 or the like; commercial products manufactured by Chang Chun Plastics Co., Ltd., and the trade name is BE 170, 235, 283 or the like.

For example, the phenolic epoxy resin can be commercial products manufactured by Nan Ya Plastics Corporation, and the trade name is NPPN 630, 638, 640 or the like; H-series or HF-series commercial products manufactured by Meiwa Plastic Industries, Ltd.; commercial products manufactured by Chang Chun Plastics Co., Ltd., and the trade name is PNE 171, 172, 174, 175, 176, 177 or the like.

For example, the naphthalene skeleton type epoxy resin can be commercial products manufactured by Vast-Well Material Development Co., Ltd., and the trade name is VastPoxy-465 or the like; commercial products manufactured by Huntsman Corporation, and the trade name is Araldite® MY 0816 or the like; commercial products manufactured by DIC Corporation produced, and the trade name is EPICLON® HP-5000, HP-4700, HP-4710 or the like.

In some embodiments, epoxy equivalent of the epoxy compound can be 100 g/eq to 1500 g/eq, and the epoxy equivalent is measured according to the standard method of JIS (Japanese Industrial Standards) K7236. When the epoxy equivalent of the epoxy compound is in the aforementioned range, the sizing agent can subject the carbon fiber material to have suitable age hardening, thereby improving the operability of the carbon fiber material, and the sizing agent can improve the bonding properties between the carbon fiber material and the resin matrix. In some embodiments, the epoxy equivalent of the epoxy compound preferably is 130 g/eq to 1000 g/eq, and more preferably is 160 g/eq to 900 g/eq.

Based on an amount of the sizing agent composition as 100 parts by weight, an amount of the epoxy compound is 2 parts by weight to 30 parts by weight, and preferably is 10 parts by weight to 25 parts by weight.

If the sizing agent composition excludes the epoxy compound, or the amount of the epoxy compound is not within the aforementioned range, the sizing agent will not efficiently improve the bonding properties between the carbon fiber material and the resin matrix, thereby lowering the properties of the obtained composite material.

The dicyclopentadiene compound can have a structure shown as following formula (I).

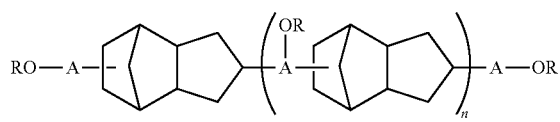

(I)

In the formula (I), A independently represents a cyclic group; R independently represents a hydrogen atom or a functional group shown as following formula (I-1) to formula (I-3); and n represents 0 or 1. In the formula (I-3), m represents 1 to 5.

(I-1)

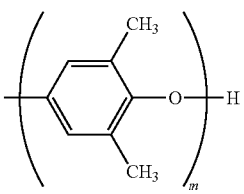

In the formula (I), the cyclic group represented by A is preferably a non-polar group. For example, the cyclic group of A can include but be not limited to a phenyl group, a bisphenol A group, a bisphenol F group, a phenolic epoxy group, or other suitable non-polar cyclic groups. When A is a non-polar cyclic group, the sizing agent can further enhance the bonding properties between the carbon fiber material and the resin matrix, therefore improving the properties of the composite material.

In some embodiments, at least one of R in formula (I) is the structure shown as the formula (I-3). When the dicyclopentadiene compound has the functional group of the formula (I-3), the sizing agent can further lower the hygroscopicity of the carbon fiber material. Preferably, the functional group shown as the formula (I-3) is a branch chain group of the dicyclopentadiene compound to efficiently lower the hygroscopicity of the carbon fiber material. If m in the formula (I) is greater than 5, an amount of the main chain structure of the dicyclopentadiene will be easily diluted by the branch chain group with excessively long length, thereby lowering the benefits of the sizing agent to the carbon fiber material. In some embodiments, based on as amount of the dicyclopentadiene compound as 100 mol %, an amount of the functional group shown as the formula (I-3) is 0.01 mol % to 0.35 mol %, and preferably is 0.015 mol % to 0.07 mol %. In these embodiments, when the amount of the functional group shown as the formula (I-3) is within the aforementioned range, the obtained sizing agent can more efficiently lower the hygroscopicity of the carbon fiber material and improve the bonding properties between the carbon fiber material and the resin matrix.

In some examples, the dicyclopentadiene compound can include but be not limited to dicyclopentadiene phenol epoxy resin, dicyclopentadiene phenolic epoxy resin, dicyclopentadiene modified isocyanate resin, and/or polyphenylene oxide (PPO) modified dicyclopentadiene resin.

For example, the dicyclopentadiene phenol epoxy resin can be commercial products manufactured by Songwon Industrial Co., Ltd., and the trade name is ERM-6085, ERM-6095, ERM-6105, ERM-6115, ERM-6125, ERM-6140 or the like.

For example, the dicyclopentadiene phenolic epoxy resin can be commercial products manufactured by Dai Nippon Printing Co., Ltd., and the trade name is HP-7200H; commercial products manufactured by Nippon Kayaku Co., Ltd., and the trade name is XD-1000; commercial products manufactured by Zhejiang Rongde Chemical Co., Ltd., and the trade name is 655-B-75; commercial products manufactured by Uniwin Chemical Co., Ltd., and the trade name is KES-7660; commercial products manufactured by Chang Chun Plastics Co., Ltd., and the trade name is DNE260; commercial products manufactured by Shin-A T&C Co., Ltd., and the trade name is SEV-3460, SEV-3475, SEV-3408, SEV-3410 or the like; commercial products manufactured by Huntsman Corporation, and the trade name is Tactix® 556, Tactix® 756 or the like.

For example, the dicyclopentadiene modified isocyanate resin can be commercial products manufactured by Dow Chemical Company and the trade name is Acrocy XU-71787.

For example, the PPO modified dicyclopentadiene resin can be a compound shown as following formula (II).

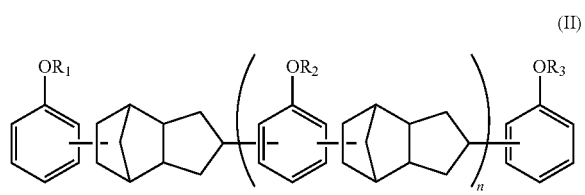

(II)

In the formula (II), at least one of $R_1$, $R_2$ and $R_3$ represents the functional group shown as the aforementioned formula (I-3) (m represents 1 to 5), and the others represent a hydrogen atom; n represents 0 or 1. Preferably, $R_1$ and $R_2$ represent a hydrogen atom, and $R_3$ represents a functional group shown as the formula (I-3).

Based on the amount of the sizing agent composition as 100 parts by weight, an amount of the dicyclopentadiene compound is 2 parts by weight to 30 parts by weight, and preferably is 10 parts by weight to 25 parts by weight.

If the sizing agent composition excludes the dicyclopentadiene compound, or the amount of the dicyclopentadiene compound is not within the aforementioned range, the obtained sizing agent will not efficiently improve the hygroscopicity and the strand integrity of the carbon fiber material, and it will be difficult to improve the bonding properties between the carbon fiber material and the resin matrix, thereby lowering the properties of the obtained composite material.

The surfactant can include a nonionic surfactant, an anionic surfactant and/or a cationic surfactant.

For example, the nonionic surfactant can be but not limited to aliphatic nonionic surfactants, aromatic nonionic surfactants, and/or other suitable nonionic surfactants. The aforementioned aliphatic nonionic surfactants can be, for example, alcohol ethylene oxide adduct, (C16-C18) Alkyl alcohol ethoxylate, polyol polyoxyethylene ethers, alkyl polyoxyethylene ethers, and/or polyethylene glycol fatty acid esters. The aforementioned aromatic nonionic surfactant can be, for example, polyethylene glycol octyl phenyl ether, polyethylene glycol styrenated aryl ether, polyethylene glycol nonyl phenyl ether, and/or polyethylene glycol bisphenol A derivative.

For example, the anionic surfactants can be but not limited to sulfate salts-based surfactants, sulfonate salts-based surfactants, phosphate salts-based surfactants, and/or other suitable anionic surfactants. The sulfate salts-based surfactant can be, for example, higher alcohol sulfate salts, higher alkyl polyglycol ether sulfate salts, alkyl phenyl ether polyglycol ether sulfate salts, styrenated phenol polyglycol ether sulfate salts, and/or polycyclic phenyl ether polyglycol ether sulfate salts. The sulfonate salts-based surfactants can be, for example, alkylbenzene sulfonates, polycyclic phenyl ether sulfonates, alkyl sulfonates, and/or dialkyl sulfosuccinates. The phosphate ester salts-based surfactants can be, for example, polyethylene glycol nonyl phenyl phosphate, polyoxyethylene alkyl phenyl ether phosphate triethanolamine salt, and/or polyethylene glycol styrenated aryl ether phosphate.

For example, the cationic surfactant can be but not limited to quaternary ammonium salts, and/or other suitable cationic surfactants. The quaternary ammonium salts can be, for example, alkyldimethylbenzene quaternary ammonium salts, alkyltrimethyl quaternary ammonium salts, dialkyldimethyl quaternary ammonium salts, ester quaternary ammonium salts, and/or imidazoline quaternary ammonium salt.

In some embodiments, the surfactant includes at least one of the anionic surfactant and the cationic surfactant except the nonionic surfactant. When the surfactant at least includes the anionic surfactant or the cationic surfactant, electrostatic repulsion generated by the charge characteristic of the surfactant facilitates to improve the emulsion stability. Preferably, the surfactant can include the anionic surfactant, or a combination of the anionic surfactant and the nonionic surfactant, thereby reducing raw material costs of the sizing agent. In some examples, the anionic surfactant may include alkali metal cations, alkaline earth metal cations, ammonium ions, other suitable cationic groups, or a combination thereof. Compared with the alkali metal cations and the alkaline earth metal cations, the anionic surfactant preferably includes ammonium ions based on the thermal stability of the obtained carbon fiber material.

Based on the amount of the sizing agent composition as 100 parts by weight, an amount of the surfactant is 0.5 parts by weight to 15 parts by weight, and preferably is 5 parts by weight to 12.5 parts by weight.

If the sizing agent composition excludes the surfactant, or the amount of the surfactant is not within the aforementioned range, the obtained sizing agent will not have good emulsion stability, thereby lowering its operability, further the aforementioned epoxy compound and the dicyclopentadiene compound will not be able to form droplets uniformly dispersed in the emulsion, and therefore lowering coating properties of the sizing agent to the carbon fiber substrate.

With the aforementioned surfactant, the epoxy compound and the dicyclopentadiene compound of the aforementioned sizing agent composition can form emulsified droplets uniformly dispersed in the water, and the droplet diameter of the emulsified droplets is not larger than 1 μm. If the droplet diameter of the emulsified droplets is larger than 1 μm, the emulsified droplets with excessive large diameter are hard to uniformly adhere onto the carbon fiber substrate, thereby lowering the properties of the obtained carbon fiber material and lowering the emulsion stability of the sizing agent, and further the operability of the sizing agent is lowered. In some embodiments, the droplet diameter of the emulsified droplets is preferably 0.01 μm to 0.5 μm.

The water of the sizing agent composition is preferably deionized water to reduce the influence of ions in the water during the sizing process. In some embodiments, the sizing agent composition of the present application may include an organic solvent to form emulsified droplets of the sizing agent by the surfactant. In other embodiments, the sizing agent composition of the present application excludes organic solvents, and therefore it is unnecessary to additionally perform removing operation to remove organic solvents, thereby reducing manufacturing costs.

In some examples, the sizing agent of the present application can be prepared by firstly dissolving the epoxy compound and the dicyclopentadiene compound of the aforementioned sizing agent composition into an organic solvent, and further mixing the surfactant and the water to obtain the sizing agent with uniformly dispersed emulsified droplets. In other examples, the sizing agent of the present application can be prepared by melting the aforementioned epoxy compound, the dicyclopentadiene compound and the surfactant at high temperature, and cooling to cloud point temperature of the surfactant after the compositions are mixed uniformly. Next, the mixture is added into the water to obtain the sizing agent with uniformly dispersed emulsified droplets.

In some applied embodiments, the aforementioned sizing agent can be uniformly adhered to the carbon fiber substrate by the conventional technology and equipment of the sizing process, thereby forming the carbon fiber material. For example, the sizing of the carbon fiber substrate can be performed by impregnation. The carbon fiber substrate is dipped in a dipping tank containing the sizing agent, and the carbon fiber substrate where the surface has been impregnated with the sizing agent is transported by a godet roller. Next, a drying step is performed at a temperature of 100° C. to 250° C. to more efficiently remove water and prevent from thermal reaction of the sizing agent. After the drying step is performed, the carbon fiber material of the present application can be obtained. The drying step can be performed by hot air drying, hot roller contact drying, infrared heating drying, other suitable drying techniques, and/or a combination thereof.

In the obtained carbon fiber material, a sizing ratio is 0.1 wt % to 5 wt %, and preferably is 0.5 wt % to 3 wt %. When the sizing ratio of the carbon fiber material is within the aforementioned range, the sizing agent can equip the carbon fiber material with good hygroscopicity, dimensional change ratio, strand integrity, wear resistance and back-end processability, and the impregnation of the carbon fiber material can be improved for the resin matrix, thereby enhancing the bonding properties between the carbon fiber material and the resin matrix, further improving the properties of the obtained composite material. In these applied embodiments, the carbon fiber material containing the sizing agent of the present application Is placed in an environment at 70° C. with a humidity of 85% RH. After at least 35 days, the hygroscopicity of the carbon fiber material is less than 0.05%, and more preferably is less than 0.02%. After heat treating at 200° C. (for 1 day), the dimensional change ratio of the carbon fiber material is less than 0.05%, and more preferably can be less than 0.02%. Besides, after placing for at least 6 months, the obtained sizing agent still has good dispersibility, such that it has good emulsion stability.

In other application embodiments, the obtained carbon fiber material subjected to the sizing process can further be blended with the resin matrix to produce the composite material. The carbon fiber material can be uniformly dispersed in the resin matrix. With the sizing agent coated on the surface of the carbon fiber substrate, the carbon fiber material and the resin matrix can have excellent bonding properties, thereby improving the properties of the composite material.

The following examples are used to illustrate the application of the present application, but it is not intended to limit the present application. Anyone skilled in the art can make various changes and modifications without departing from the spirit and scope of the present application.

Synthesis Embodiments

In an environment with nitrogen, 40 g of poly oxyxylene (PPO) was dissolved in toluene at 90° C., and 4 g of dicyclopentadiene phenol novolac (DCPDNO) was added. Then, 4 g of benzyl peroxide (BPO) was slowly added to carry out the reaction. After the reaction is performed for 3 hours, the reacting solution was cooled to room temperature and purified with methanol to obtain pale-yellow precipitates. And then, excess BPO was removed by $Na_2CO_3$, and a vacuum dehydration was performed at 110° C. to obtain the dicyclopentadiene compound shown as the following formula (III). In the formula (III), $R_1$ and $R_2$ represent a hydrogen atom, and Ra represents a functional group shown as the aforementioned formula (I-3), m represents the number of repeating units of the BPO molecule, and m represents 1 to 5.

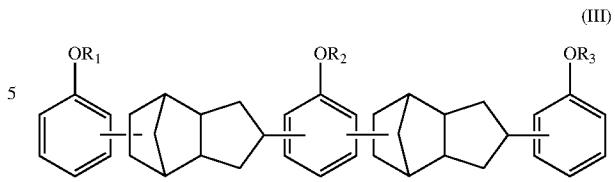

Producing Sizing Agent and Carbon Fiber Material

Embodiment 1

30 parts by weight of the epoxy compound (A-1), 2 parts by weight of the dicyclopentadiene compound (B-1), 4.8 parts by weight of the surfactant (C-1) and 1.6 parts by weight of the surfactant (C-4) were heated above the melting point, and mixed by an IKA blender. After uniformly mixing, the mixture was cooled down to the cloud temperature of the surfactant (C-1). Then, the rotating speed was adjusted to 5000 rpm to 10000 rpm, and 61.6 parts by weight of water was slowly added within 2 hours to obtain the sizing agent of Embodiment 1.

Furthermore, according to the aforementioned description and conventional technology and equipment of the sizing processes, the carbon fiber substrate (containing 12,000 single-strand fibers. The strength of the single-strand fiber is about 4900 MPa, and its modulus is 250 GPa) was immersed in a dipping tank containing the sizing agent, and the carbon fiber substrate where the surface had been impregnated with the sizing agent was transported by a godet roller. Then, the drying step was performed at a temperature of 100° C. to 250° C., therefore winding the obtained carbon fiber material of Embodiment 1.

For the carbon fiber material obtained in Embodiment 1, a sample of carbon fiber material with a length of 1 meter was taken, and its weight ($W_{11}$) was measured. Then, the sample of carbon fiber material was placed in an oven at 450° C. After 20 minutes, the sample of carbon fiber material was taken out, and its weight ($W_{12}$) was measured after cooling down 6 minutes. The sizing ratio of the carbon fiber material of Embodiment 1 can be calculated with the following formula, and the sizing ratio of the carbon fiber material of Embodiment 1 is 0.8 wt % to 1.2 wt %.

$$\text{Sizing Ratio (\%)} = \frac{(W_{11} - W_{12})}{W_{11}} \times 100\%$$

Besides, droplet diameter, migration rate, hygroscopicity, dimensional change ratio and interlaminar shear strength (ILSS) of the sizing agent and the carbon fiber material of Embodiment 1 were evaluated with the following evaluation method, and the evaluation results were shown in Table 1.

Embodiment 2 to Embodiment 20

Embodiment 2 to Embodiment 20 were practiced with the same method as in Embodiment 1 by various types and amounts of the raw materials in the sizing agent. The compositions and the evaluation results are shown in Table 1. The sizing ratio of the carbon fiber material of Embodiment 2 to Embodiment 20 was controlled within 0.8 wt % to 1.2 wt %.

TABLE 1

| | | | Embodiment | | | | | | | | | |
|---|---|---|---|---|---|---|---|---|---|---|---|---|
| | | | 1 | 2 | 3 | 4 | 5 | 6 | 7 | 8 | 9 | 10 |
| Composition (parts by weight) | Epoxy compound | A-1 | 30 | 2 | 30 | 16 | | | | | | |
| | | A-2 | | | | | 13 | | | | 12 | |
| | | A-3 | | | | | | 15 | | 12 | | |
| | | A-4 | | | | | | | 20 | | | 12 |
| | Dicyclopentadiene compound | B-1 | 2 | 30 | 2 | 16 | 19 | 17 | 12 | | | |
| | | B-2 | | | | | | | | | | |
| | | B-3 | | | | | | | | 20 | 20 | 20 |
| | | B-4 | | | | | | | | | | |
| | Surfactant | C-1 | 4..8 | 4.8 | 8 | 8 | | | | | | |
| | | C-2 | | | | | 9 | 7 | | 7 | | |
| | | C-3 | | | | | | | 9 | | 8.5 | |
| | | C-4 | 1.6 | 1.6 | 2 | 2 | | | | | | 10 |
| | | C-5 | | | | | 1 | 3 | 1 | 3 | 1.5 | |
| | | C-6 | | | | | | | | | | |
| | Water | | 61.66 | 61.6 | 58 | 58 | 58 | 58 | 58 | 58 | 58 | 58 |
| Evaluation result | Droplet diameter (nm) | | 160 | 175 | 145 | 156 | 152 | 201 | 150 | 162 | 154 | 195 |
| | Migration rate (%/h) | | 23.5 | 25.1 | 21 | 23 | 27.5 | 29.1 | 22.4 | 23.8 | 22.8 | 28.6 |
| | Hygroscopicity (%) | | 0.03 | 0.04 | 0.03 | 0.02 | 0.03 | 0.03 | 0.03 | 0.04 | 0.04 | 0.04 |
| | Dimensional change ratio (%) | | 0.01 | 0.01 | 0.01 | 0.01 | 0.01 | 0.01 | 0.02 | 0.02 | 0.02 | 0.02 |
| | ILSS (kgf/mm$^2$) | | 8.1 | 8.8 | 8.1 | 8.3 | 8.5 | 8.5 | 8.2 | 8.4 | 8.4 | 8.5 |

| | | | Embodiment | | | | | | | | | |
|---|---|---|---|---|---|---|---|---|---|---|---|---|
| | | | 11 | 12 | 13 | 14 | 15 | 16 | 17 | 18 | 19 | 20 |
| Composition (parts by weight) | Epoxy compound | A-1 | 10 | | | | | | | 6 | | |
| | | A-2 | | | | | 12 | | 20 | | 6 | 6 |
| | | A-3 | | | | | | 11 | | | | |
| | | A-4 | | 2 | 30 | 12 | | | | 6 | 6 | 6 |
| | Dicyclopentadiene compound | B-1 | | | | | | | | | | |
| | | B-2 | | | | | | | 12 | 20 | 20 | 20 |
| | | B-3 | 25 | | | | | | | | | |
| | | B-4 | | 2 | 30 | 20 | 20 | 21 | | | | |
| | Surfactant | C-1 | | | | 10 | | | | | | |
| | | C-2 | | | 11.3 | | 8 | 9 | | | | |
| | | C-3 | | 0.5 | | | | | | 8 | 7.5 | 5 |
| | | C-4 | 9 | | | | | | 10 | | | |
| | | C-5 | 1 | | | | | | | | | |
| | | C-6 | | | 3.75 | | 2 | 2.5 | | 2 | 2.8 | 2 |
| | Water | | 55 | 85.5 | 25 | 58 | 58 | 55.5 | 58 | 58 | 58 | 61 |
| Evaluation result | Droplet diameter (nm) | | 151 | 215 | 200 | 163 | 165 | 142 | 171 | 173 | 177 | 211 |
| | Migration rate (%/h) | | 22.5 | 29.8 | 29.4 | 24 | 24.2 | 20.8 | 25.4 | 25.8 | 25.3 | 29.7 |
| | Hygroscopicity (%) | | 0.03 | 0.02 | 0.03 | 0.03 | 0.03 | 0.02 | 0.02 | 0.02 | 0.02 | 0.02 |
| | Dimensional change ratio (%) | | 0.03 | 0.01 | 0.01 | 0.01 | 0.01 | 0.01 | 0.01 | 0.01 | 0.01 | 0.01 |
| | ILSS (kgf/mm$^2$) | | 8.5 | 8.3 | 8.5 | 8.8 | 8.4 | 8.4 | 8.3 | 8.4 | 8.5 | 8.5 |

A-1 commercial product with a trade name of NPEL 128
A-2 commercial product with a trade name of NPEL 17
A-3 commercial product with a trade name of NPPN 640
A-4 commercial product with a trade name of HP-5000
B-1 commercial product with a trade name of ERM-6140
B-2 commercial product with a trade name of XD-1000
B-3 commercial product with a trade name of Acrocy XU-71757
B-4 dicyclopentadiene compound shown as formula (III)
C-1 polyethylene glycol styrenated aryl ether with a trade name of SINOPOL P-709 manufactured by Sino-Japan Chemical Co. Ltd.
C-2 polyethylene glycol styrenated aryl ether with a trade name of SINOPOL 610 manufactured by Sino-Japan Chemical Co, Ltd.
C-3 polyethylene glycol styrenated aryl ether with a trade name of SINOPOL 804 manufactured by Sino-Japan Chemical Co, Ltd
C-4 alkyl polyoxyethylene ether with a trade name of ABLUNOL NP-10 manufactured by Taiwan Surfactant Corp.
C-5 akyl phenyl ether polyethylene glycol ether sulfate salt with a trade anme of SINONATE 962SF manufactured by Sino-Japan Chemical Co. Ltd.
C-6 styrenated phenol polyglycol ether sulfate salt with a trade name of SINONATE 707SFL manufactured by Sino-Japan Chemical Co. Ltd.

Comparative Embodiment 1

36 parts by weight of rosin ester (commercial products manufactured by Harima Chemicals Group, Inc., and the trade name is HARITACK SE10) and 4 parts by weight of surfactant (commercial products manufactured by Dai-Ichi Kogyo Seiyaku Co., Ltd., and the trade name is NOIGEN EA-167) were heated to 90° C. and mixed with 80 parts by weight of water to form a dispersion. Then, 200 parts by weight of a polyurethane resin aqueous based dispersion (commercial products manufactured by Dal-Ichi Kogyo Seiyaku Co., Ltd. and the trade name is EX 300) containing 30 wt % of nonvolatile matter was added. Next, water was added to decrease the nonvolatile content to 20 wt %, and therefore the sizing agent of Comparative Embodiment 1 was produced. According to the following evaluation method, the droplet diameter of the sizing agent of Comparative Embodiment 1 was 187 nm, and the migration rate was 28.0%/h.

The carbon fiber material of Comparative Embodiment 1 was practiced with the same method as in Embodiment 1. Based on the following evaluation method, the hygroscopicity of the carbon fiber material of Comparative Embodiment 1 was 0.3%, the dimensional change ratio thereof was 0.23%, and ILSS thereof was 7.2 kgf/mm².

Comparative Embodiment 2

25 parts by weight of bisphenol A type epoxy resin (commercial products manufactured by Mitsubishi Chemical Co. Ltd., and the trade name is JER 1001; an epoxy equivalent is 475 g/eq) and 25 parts by weight of polyoxy propylene glycol diacrylate (commercial products manufactured by Shin-Nakamura Chemical Co., Ltd., and the trade name is APG-400; (meth)acrylamide equivalent is 268 g/eq), 35 parts by weight of polyester resin (the polyester resin obtained in Producing Embodiment 14 recited in Publication No. TW 202014576 A) and 15 parts by weight of nonionic surfactant (commercial products manufactured by Solvay Co. Ltd. and the trade name is Soprophor796/P) were heated to 60° C. After dissolving for 30 minutes and then water was added for 6 hours, the sizing agent of Comparative Embodiment 2 can be prepared (the water dispersed concentration was 40 wt %). According to the following evaluation method, the droplet diameter of the sizing agent of Comparative Embodiment 2 was 210 nm, and the migration rate was 29.4%/h.

The carbon fiber material of Comparative Embodiment 2 was practiced with the same method as in Embodiment 1. Based on the following evaluation method, the hygroscopicity of the carbon fiber material of Comparative Embodiment 2 was 0.15%, the dimensional change ratio thereof was 0.15%, and ILSS thereof was 7.5 kgf/mm².

Evaluation Method

1. Droplet Diameter

The droplet diameters (Dv50) of the sizing agents of Embodiment 1 to Embodiment 20 and Comparative Embodiment 1 and Comparative Embodiment 2 were measured with an instrument manufactured by Brookhaven Instruments Co., and the trade name was Nanobrook Omni.

2. Migration Rate

The migration rates of the sizing agent of Embodiment 1 to Embodiment 20 and Comparative Embodiment 1 and Comparative Embodiment 2 were measured with an instrument manufactured by LUM GmbH, and the trade name was LUMiSizer 651, and thereby the migration rate of the emulsified particles could be calculated by transmittance of the sizing agent. Accordingly, the emulsification stability of the sizing agent can be evaluated. Based on the measuring results, the emulsification stability of the sizing agent was better as a lowering of the migration rate. When the migration rate was less than 30% h, the storage time of the sizing agent can be longer than 6 months.

3. Hygroscopicity

A piece of the carbon fiber substrate without covering the sizing agent was extracted, and its weight ($W_{21}$) was measured. After coating the sizing agent of each Embodiments and Comparative Embodiments, the sized carbon fiber material with the same length was extracted, and its weight ($W_{22}$) was measured. The extracted carbon fiber substrate and the carbon fiber material were placed in a box with an environment of constant temperature (70° C.) and humidity (85% RH). After at least 35 days, the weight ($W_{23}$) of the carbon fiber substrate and the weight ($W_{24}$) of the carbon fiber material were measured respectively, and the hygroscopicity of the obtained carbon fiber material of each Embodiments and Comparative Embodiments can be calculated with the following formula.

$$\text{hygroscopicity} = \frac{W_{24} - W_{22}}{W_{23} - W_{21}} \times 100\%$$

4. Dimensional Change Ratio

The obtained carbon fiber material of each Embodiments and Comparative Embodiments with a length of 5 cm was collected, and the filament width ($D_1$) was measured with a vernier caliper. The carbon fiber material was placed in an oven at 200° C. After heat treatment for 1 day, the filament width ($D_2$) after the heat treatment was measured, and the dimensional change ratio of the obtained carbon fiber material of each Embodiments and Comparative Embodiments could be calculated with the following formula.

$$\text{Dimensional change ratio} = \frac{D_2 - D_1}{D_1} \times 100\%$$

5. Interlaminar Shear Strength

The carbon fiber material of each Embodiments and Comparative Embodiments was treated with UD prepreg to form a laminate with a thickness of 3 mm, and the interlaminar shear strength of the laminates is measured based on the standard method of American Society for Testing and Materials (ASTM) D-23445. Therefore, the bonding properties between the sized carbon fiber material and the commercial epoxy resin could be evaluated.

As shown in Table 1, the migration rate of all the sizing agents of the present application is less than 30%/h, and therefore the sizing agent has good emulsion stability, thereby having better stability and operability. Furthermore, the diameter of the emulsified droplets of all the sizing agents are less than 220 nm, and therefore the sizing agents can be uniformly covered onto the carbon fiber substrate, thereby efficiently improving the properties of the obtained carbon fiber material. For the carbon fiber materials of Embodiment 1 to Embodiment 20, the hygroscopicity of the carbon fiber materials are all less than 0.05% after exposing at high temperature and high humidity environment for a long-term, such that adhesion between the carbon fibers caused by absorbing moisture can be efficiently inhibited, thereby improving operability of the carbon fiber material and improving the bonding properties between the carbon fiber material and the resin matrix. In addition, after heat treating at high temperature, the carbon fiber material of the present application also has a lower dimensional change ratio. Moreover, the carbon fiber material of each Embodiments has higher shear strength than that of Comparative Embodiments based on the evaluation results of the interlaminar shear strength. Therefore, the sizing agent composition of the present application can efficiently enhance the bonding properties between the carbon fiber material and the resin matrix.

Accordingly, the sizing agent formed from the sizing agent composition of the present application can efficiently improve the hygroscopicity, the strand integrity and the dimensional change ratio at high temperature of the carbon fiber material, and can improve the bonding properties between the carbon fiber material and the resin matrix, thereby enhancing the properties of the obtained composite material.

Although the present application has been disclosed with the embodiments described above, the embodiments are not used to limit the present application. It will be apparent to those skilled in the art that various modifications and variations can be made to the structure of the present application without departing from the scope or spirit of the present application. Therefore, the scope of protection in the present application is determined by the scope of the following claims.

What is claimed is:

1. A sizing agent composition, comprising:
   an epoxy compound;
   a dicyclopentadiene compound, wherein the dicyclopentadiene compound has a structure shown as the following formula (I):

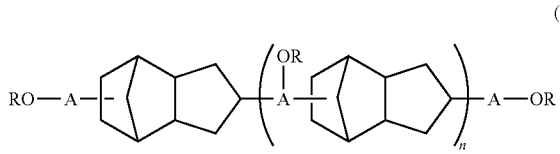

(I)

wherein A independently represents a non-polar cyclic group; R independently represents a hydrogen atom or a functional group shown as the following formula (I-1) to formula (I-3); and n represents 0 or 1;

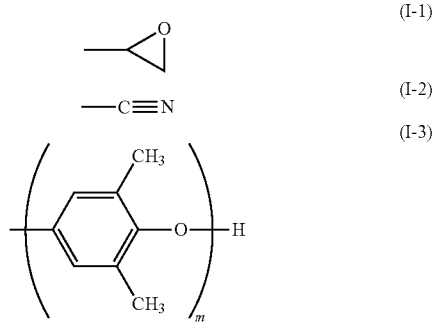

in the formula (I-3), m represents 1 to 5;
   a surfactant; and
   water,
   wherein based on an amount of the sizing agent composition as 100 parts by weight, an amount of the epoxy compound is 2 parts by weight to 30 parts by weight, an amount of the dicyclopentadiene compound is 2 parts by weight to 30 parts by weight, an amount of the surfactant is 0.5 parts by weight to 15 parts by weight, and an amount of the water is 25 parts by weight to 95.5 parts by weight.

2. The sizing agent composition of claim 1, wherein an epoxy equivalent of the epoxy compound is 100 g/eq to 1500 g/eq.

3. The sizing agent composition of claim 1, wherein at least one of the R represents the structure shown as the formula (I-3).

4. The sizing agent composition of claim 1, wherein the dicyclopentadiene compound has a structure shown as the following formula (III):

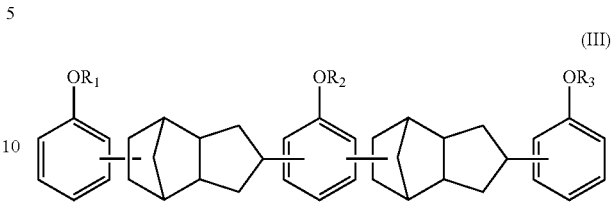

(III)

in the formula (III), $R_1$ and $R_2$ represent a hydrogen atom, and $R_3$ represents the structure shown as the formula (I-3).

5. The sizing agent composition of claim 1, wherein the surfactant includes a nonionic surfactant.

6. The sizing agent composition of claim 1, wherein the surfactant includes an anionic surfactant or a combination of an anionic surfactant and a nonionic surfactant.

7. The sizing agent composition of claim 1, wherein the surfactant includes an anionic surfactant with ammonium ion.

8. The sizing agent composition of claim 1, wherein the sizing agent composition excludes an organic solvent.

9. The sizing agent composition of claim 1, wherein the sizing composition is an emulsion and in a form of emulsified droplets, and a droplet diameter of the emulsified droplets is not larger than 1 μm.

10. A carbon fiber material, comprising:
    a carbon fiber substrate; and
    a sizing agent comprising the sizing agent composition of claim 1, wherein the sizing agent is coated on a surface of the carbon fiber substrate, and a droplet diameter of the sizing agent is not larger than 1 μm.

11. The carbon fiber material of claim 10, wherein the sizing agent is not subjected to a thermal reaction at a temperature less than and equal to 250° C., and the thermal reaction is induced by heat energy.

12. The carbon fiber material of claim 10, wherein a sizing ratio of the carbon fiber material is 0.1 wt % to 5 wt %.

13. The carbon fiber material of claim 12, wherein a hygroscopicity of the carbon fiber material is lower than 0.05%, and a dimensional change ratio of the carbon fiber material is lower than 0.05%.

14. A composite material, comprising:
    a resin matrix; and
    the carbon fiber material of claim 10, wherein the carbon fiber material is dispersed in the resin matrix, and interlaminar shear strength (ILSS) between the resin matrix and the carbon fiber material is not less than 8 kgf/mm$^2$.

* * * * *